United States Patent [19]
Swanberg

[11] Patent Number: 5,103,334
[45] Date of Patent: Apr. 7, 1992

[54] RESOLUTION IMPROVEMENT IN FLYING SPOT SCANNER

[75] Inventor: Melvin E. Swanberg, Claremont, Calif.

[73] Assignee: Xerox Corporation, Stamford, Conn.

[21] Appl. No.: 623,156

[22] Filed: Nov. 6, 1990

[51] Int. Cl.⁵ .......................... G02B 26/08; H01J 5/16; G02F 1/11
[52] U.S. Cl. ..................................... 359/197; 359/223; 359/900; 359/305; 250/235
[58] Field of Search .............. 359/196, 198, 201, 209, 359/210, 211, 216, 217, 220, 223, 315, 322, 305, 312; 250/234-236

[56] References Cited

U.S. PATENT DOCUMENTS

| | | | |
|---|---|---|---|
| 4,295,145 | 10/1981 | Latta | 359/312 |
| 4,314,154 | 2/1982 | Minoura et al. | 359/207 |
| 5,018,808 | 5/1991 | Meyers et al. | 250/235 |

Primary Examiner—Bruce Y. Arnold
Assistant Examiner—James Phan
Attorney, Agent, or Firm—Anglin & Giaccherini

[57] ABSTRACT

An improved flying spot scanner (48, 68) is disclosed, which is particularly applicable to use with a raster output scanner (ROS). The primary scan provided by an ROS is a continuous scan of the optical beam (26) along the scan line (40). The present invention provides a discontinuous pixel-by-pixel scan in the opposite direction to the continuous primary scan. Thus each pixel is positioned statically at its correct location on the photoreceptor (54) during the pixel's duration. At the end of each pixel's duration, the beam snaps rapidly to the position of the next pixel. Use of this invention will form a non-blurred image of each pixel on the photoreceptor (54). The invention uses an optical deflector (50, 70) to drive the beam opposite to the direction of the primary beam scan during each pixel's duration. The optical deflector (50, 70) may be an angle deflector (50) when used in a collimated optical beam (60), or it may be a translation deflector (70) when used in a non-collimated optical beam (72). This invention provides a flying spot scanner (48, 68) in which all the gray scale detail and resolution available in a pixel is preserved, with no smearing or blurring of pixels, independent of the content of adjacent pixels.

7 Claims, 7 Drawing Sheets

RESOLUTION IMPROVEMENT IN FLYING SPOT SCANNER

BACKGROUND OF THE INVENTION

The present invention relates to flying spot scanners, which are used as raster input scanners, or as raster output scanners (ROS). The invention is particularly applicable to ROS's used for electronic image transmission and processing, such as laser printing and facsimile.

Figure 1A:
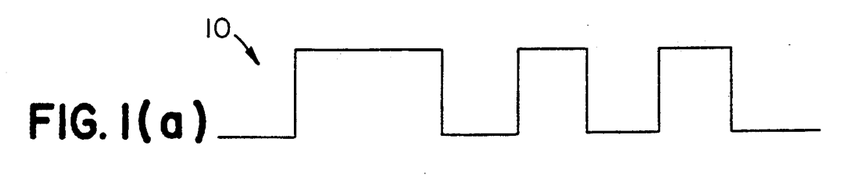
FIGS. 1(a)–1(e) show how a scan pattern is written on a photoreceptor, using circular pixels. It also shows how the continuous scan of a flying spot scanner causes each pixel to be blurred, by overwriting an adjacent pixel, and it shows profiles of unblurred and blurred exposures.
Figure 1B:
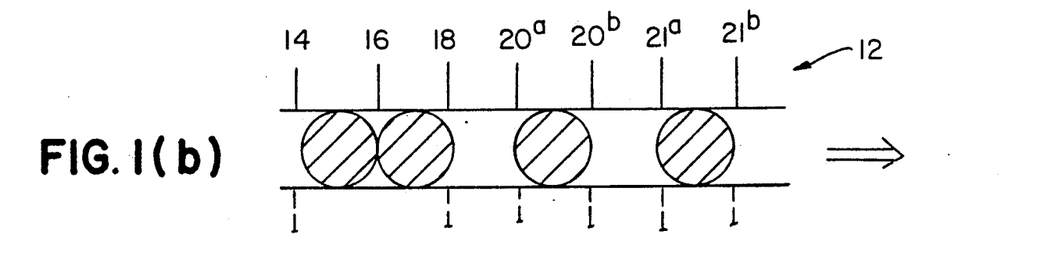

In a conventional ROS, a modulated optical beam is raster-scanned across a photoreceptor, with the light spot being rapidly scanned horizontally, thus forming a horizontal scan line, and the light spot being simultaneously scanned vertically at a slower speed. The photoreceptor may be an electrostatically charged drum, or some other form of photosensitive imaging device. Horizontal scanning may be provided by a rotating wheel having a number of flat mirror facets on its periphery. Vertical scanning may be provided by steering the optical beam, but it is usually provided by moving the photoreceptor itself in a vertical direction. As shown in FIG. 1, the continuous horizontal scanning has the effect of smearing out and blurring each exposed pixel horizontally, and thereby decreasing the resolution of the scanner's output image. This effect occurs when there is a transition from one exposure level to another, e.g. from exposure on to exposure off or from exposure off to exposure on. FIG. 1a shows a desired pattern as it would be laid along a scan line. FIG. 1b shows how this segment of a scan line would ideally be written using a string of round pixels, corresponding to the sequence in FIG. 1a: 2 pixel exposures followed by alternating exposures off and on. The first pixel exposure begins at time 14 and ends at time 16; the second pixel exposure begins at time 16 and ends at time 18, blending into one exposure interval. The third pixel exposure begins at time 20a and ends at time 20b, and the fourth pixel exposure begins at time 21a and ends at time 21b.

Figure 1C:
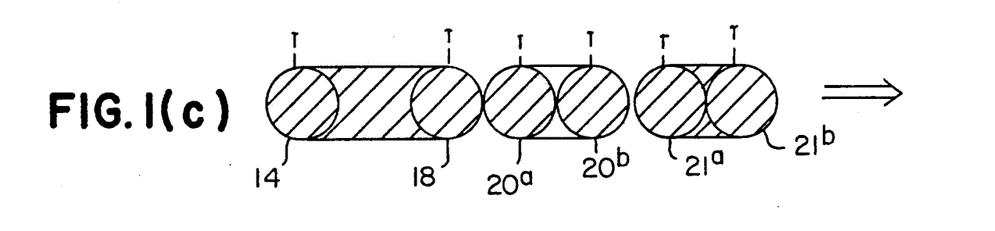
Figure 1D:
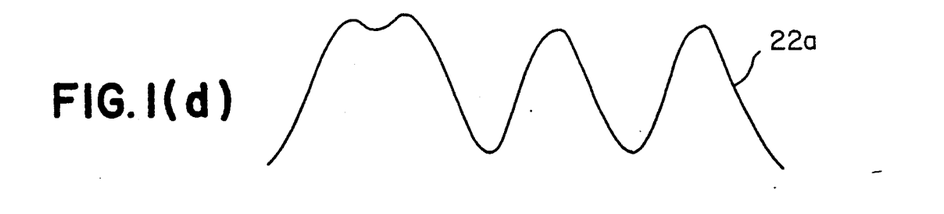
Figure 1E:
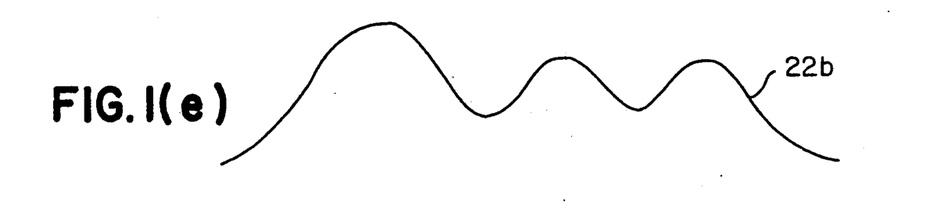

FIG. 1c shows how blur occurs in a conventional flying spot scanner due to movement of the spot during exposure intervals. The spot is centered at position 14 at the start of the first exposure interval, and centered at position 18 at the end of this exposure interval. Similarly, the spot is positioned at 20a and 21a at the start of the second and third exposure intervals, respectively; and at positions 20b, and 21b at the end of the second and third exposure intervals, respectively. FIG. 1d shows a typical exposure profile that would result from positioning spots at the locations indicated by FIG. 1a, and maintaining these positions during the exposure intervals. FIG. 1e shows a typical exposure density profile that results from a scanning spot that moves during the exposure intervals as shown in FIG. 1c. In the blurred image of FIG. 1e, the transition gradient between exposed and unexposed areas is reduced relative to the unblurred image of FIG. 1d, and the contrast between adjacent single exposed and unexposed pixels is reduced relative to the unblurred image of FIG. 1e.

In order to overcome the effects of exposure blur it is common practice in flying spot scanning systems to utilize an elliptical spot rather than a round spot as shown in FIG. 1. The small axis of the ellipse is oriented in the horizontal scan direction, so that the blurring effect in the horizontal creates a more or less round exposure. However, there are undesirable side effects to using elliptical scanning spots: the f-number of the spot producing beam must be decreased (increased input beam size) in the horizontal axis. This increased beam size requires an equal increase in the size of the scanning mirror facet, and the decreased f-number also causes the depth of focus to be decreased which makes mechanical alignment more difficult. Also, some scanning systems cause the spot to rotate as it is scanned, which thus precludes use of an elliptical spot for exposure blur compensation.

The present invention causes each individual pixel to be stabilized on the photoreceptor while the pixel is being written, so that there is no smearing of pixels due to beam motion. The present invention also enables the output beam of the scanner to move rapidly from pixel to pixel.

The problem of providing high quality output from raster output scanners has presented a major challenge to designers. Improved resolution would provide higher quality output than is presently available from flying spot scanners/raster output scanners. There is a long felt need within the flying spot scanner industry for a scanner which will output distinct, well-defined pixels.

SUMMARY OF THE INVENTION

The present invention involves apparatus and methods for positioning the individual pixels which are output by a raster output scanner (ROS), so that each individual pixel is distinct. Each pixel is spatially stabilized on the photoreceptor for the pixel's duration. This is accomplished by providing a one pixel "horizontal" scan in the opposite direction to the rapid "horizontal" optical scan generated by the ROS. This one pixel scan has a velocity which is opposite in direction to the basic scan, and is generated in synchronism with each pixel. The optical beam is therefore stabilized on the photoreceptor during each pixel and rapidly snaps to the next pixel during the transition from one pixel to the next.

If the one pixel "corrective" scan is performed in a collimated optical beam, the correction can be made by scanning in angle. If, on the other hand, the one pixel scan is performed in a diverging or converging optical beam, then the correction can be made by translating the optical beam by one pixel width. Both these "corrective" techniques are within the scope of this invention.

An appreciation of other aims and objectives of the present invention and a more complete and comprehensive understanding of this invention may be achieved by studying the following description of a preferred embodiment and by referring to the accompanying drawings.

BRIEF DESCRIPTION OF THE DRAWINGS

FIGS. 3a and 3b show a preferred embodiment of this invention in which an angle deflector is added in the path of the collimated optical beam between the collimating lens and the rotating scan mirror. In FIG. 3a, the angle deflector does not operate, while FIG. 3b shows the invention in operation.

DESCRIPTION OF THE PREFERRED EMBODIMENT

FIG. 1 illustrates the problem which this invention is designed to solve. FIG. 1a is a desired intensity pattern of light and dark pixels which is to be laid down on a photoreceptor by a raster output scanner (ROS). FIG. 1b indicates how an idealized pattern would look when the ROS outputs round pixels. FIG. 1c shows the pattern blur actually produced by a moving ROS beam. FIG. 1d shows the horizontal exposure profile 22a that would be produced under the idealized conditions shown in FIG. 1b. FIG. 1e shows the less distinct horizontal exposure profile 22b produced under the actual conditions of spot motion during the exposure, as shown in FIG. 1c. Thus in this specific example illustrated by FIG. 1e, the image formed has less resolution along the scan line (horizontally) than it does orthogonal to the scan line (vertically).

Figure 2A:
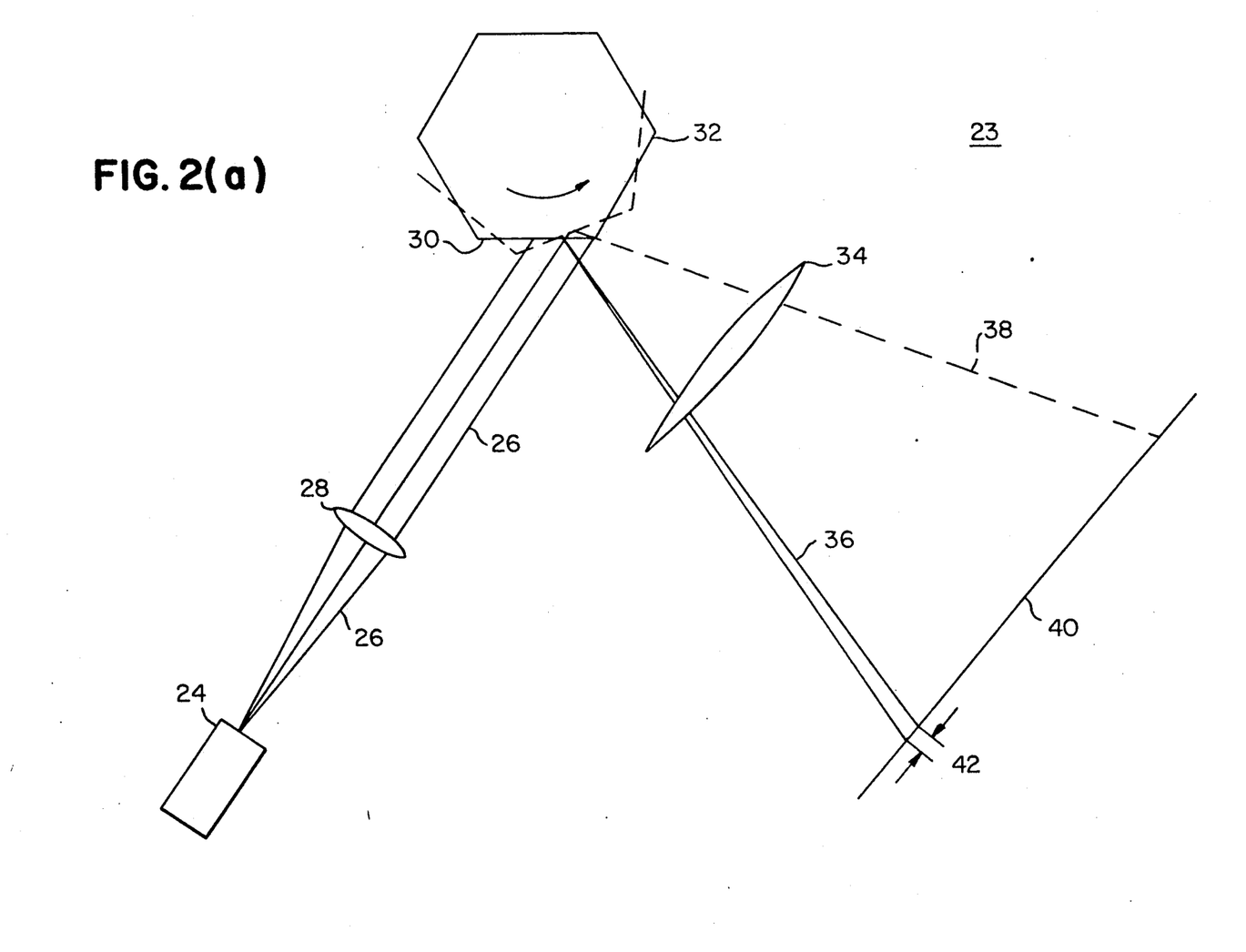
FIG. 2a is a schematic of a generic raster output scanner (ROS) which does not incorporate the subject invention.

FIG. 2a illustrates the generic design of a raster output scanner (ROS) 23. The scanner 23 includes a laser 24, which emits a beam 26 which is collimated by lens 28, reflected from facet 30 of rotating scan mirror 32, and then focussed by lens 34. For the purpose of clarity, only the central ray of the beam reflected from the facet 30 is shown. The reflected beam 36 scans the zeroth pixel, and reflected beam 38 scans the nth pixel, the pixels being located along scan line 40. Each pixel exposure is blurred by the dimension 42 along the scan direction, which is shown exaggerated in FIG. 2a. The beam 26 is modulated with useful information by means of a modulator, which is not specifically shown in this Figure, or by control of the laser light source 24 directly.

Figure 2B:
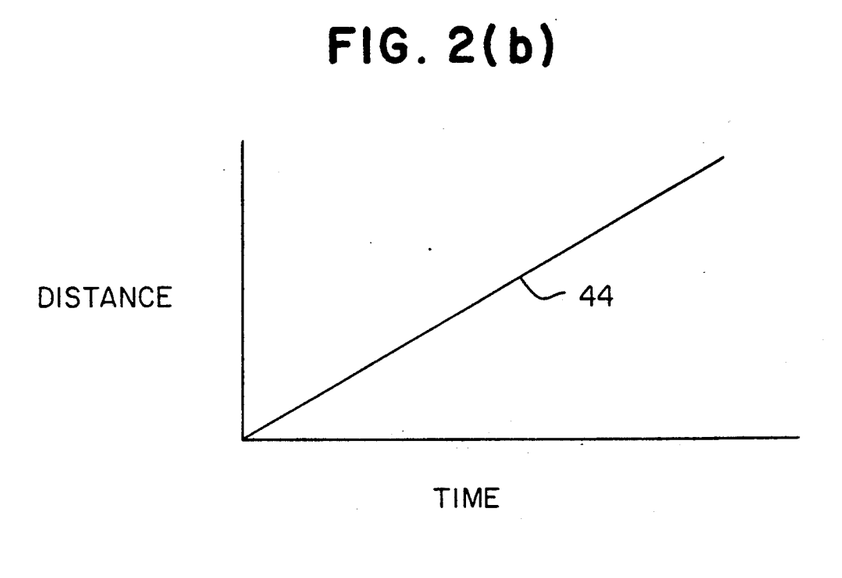
FIG. 2b is the time versus distance profile of a pixel in a conventional ROS.
Figure 2C:
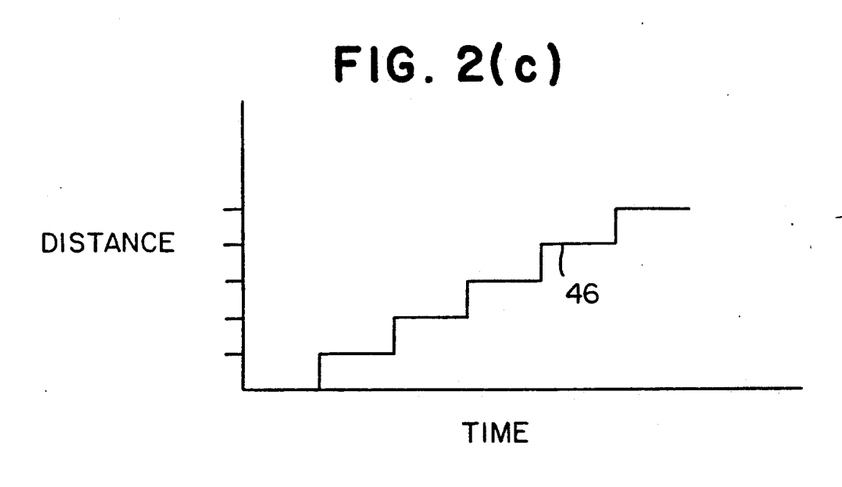
FIG. 2c is the preferred time versus distance profile provided by the subject invention.

The concept of a "pixel" requires that there be a pixel time associated with each physical pixel. The distance that beam 36, 38 has progressed along scan line 40 is shown graphically in FIG. 2b as plot 44. Plot 44 is a linear function of time. I.e. the moving optical beam 36, 38 moves continuously, so that a pixel may be defined as occupying either a specific distance along the scan line, or as occupying an equal "pixel time" during the scan. In FIG. 2c, a preferred time versus distance profile 46 is shown. In this preferred scan profile 46, which is achieved by the subject invention, the beam dwells on each pixel for the entire pixel time, then "snaps" quickly to the next pixel position. The beam movement along the scan line is not linear with time.

Figure 3A:
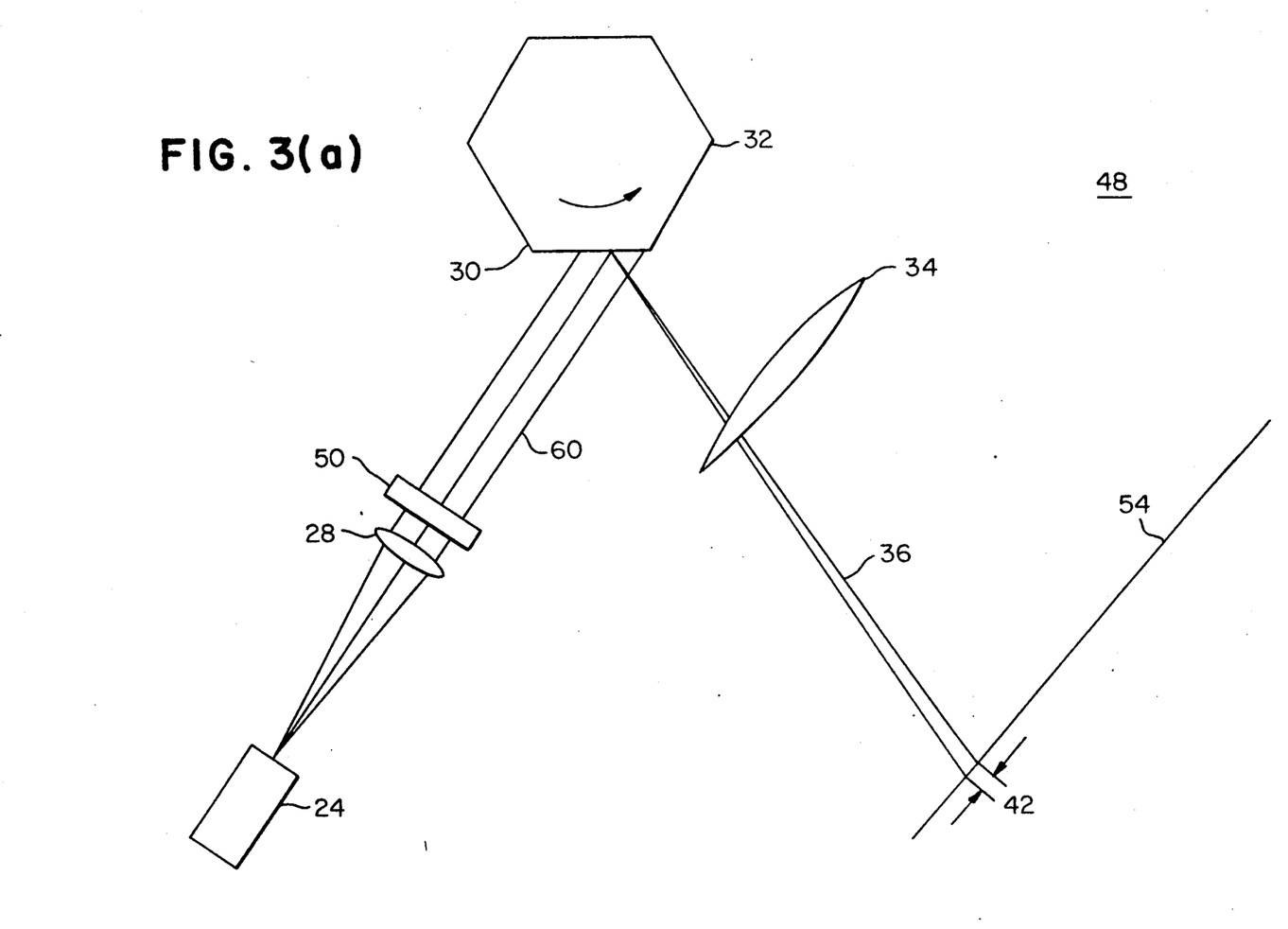
Figure 3B:
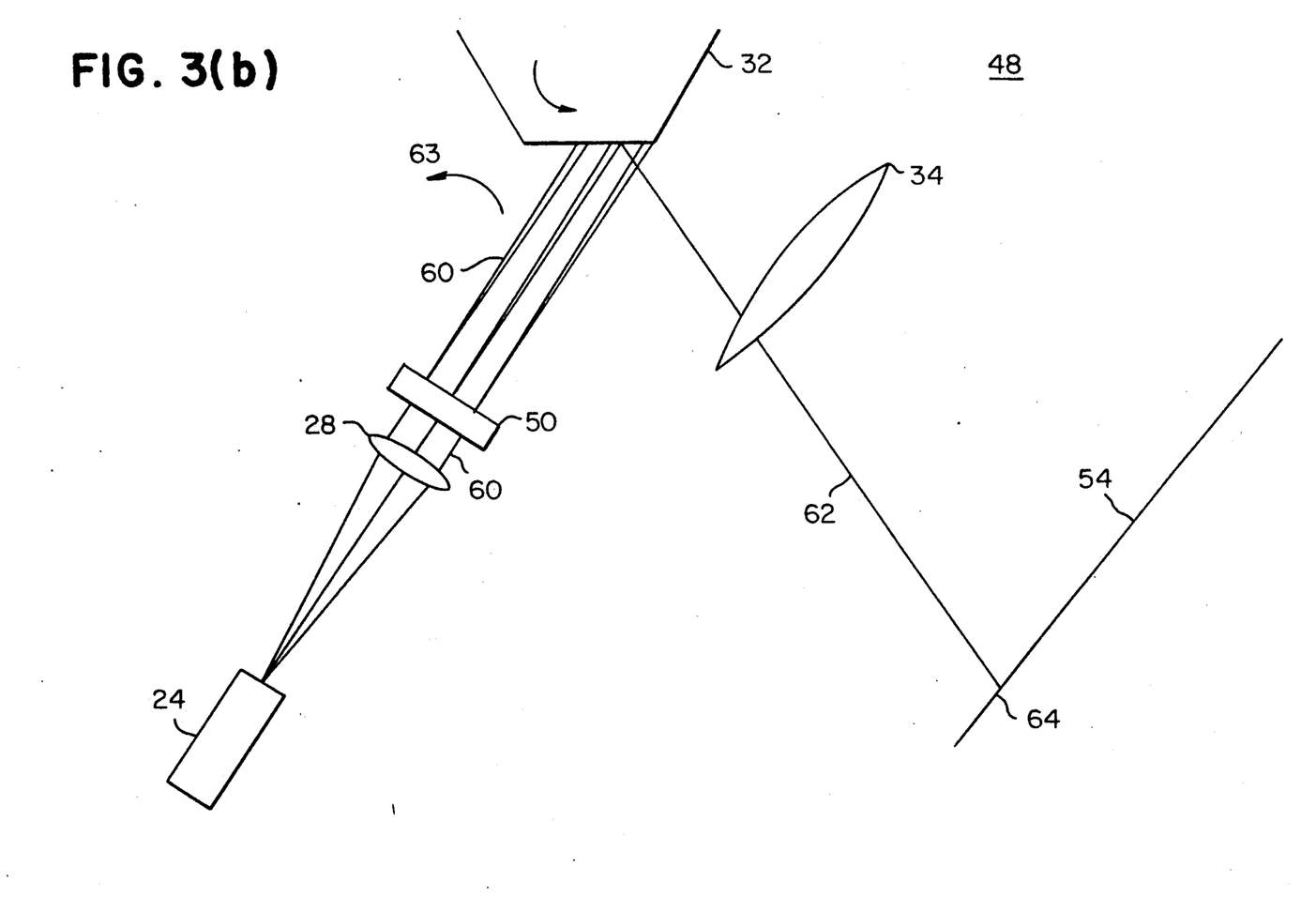

FIGS. 3a and 3b show a preferred embodiment of this invention 48 in which a second angle deflector 50 has been interposed in the collimated beam 60, between collimating lens 28 and rotating scan mirror 32. The angle deflector 50 may be, for example, an electro-optical device constructed of an optically active crystal and configured to change the angle through which the beam is refracted as a function of the applied voltage. The angle deflector 50 need only be capable of moving the optical beam through a small angle, corresponding to the size of one pixel at the photoreceptor.

FIG. 3a indicates a system where the second angle deflector 50 is installed, but inoperative. This is equivalent to a conventional ROS which does not make use of the present invention. Ray 36 from laser 24 is not deflected before impinging on moving mirror facet 30. Thus during one pixel time, the ray reflected from the facet 30 moves along photoreceptor 54 a distance 42 equal to a pixel diameter. The distance 42 is exaggerated for clarity in FIG. 3a.

FIG. 3b shows what happens when the second angle deflector 50 is operating and driven with the proper voltage waveform. In this case collimated beam 60 is deflected in angle by angle deflector 50, and converging output beam 62, reflected from moving facet 30, impinges on the first pixel location 64 along photoreceptor 54 during the first pixel time. The angular deflection 63 due to second angle deflector 50 cancels that due to the deflection of mirror facet 30, so that the output beam 62 does not move on the photoreceptor 54 during a pixel time. This angular deflection 63 would be opposite in direction and equal to twice the angle of rotation of the rotating scan mirror 32 that occurs during the pixel exposure period. At the end of each pixel time, angle deflector 50 abruptly stops deflecting collimated beam 60, and output ray 62 quickly snaps to the next pixel position.

Figure 4:
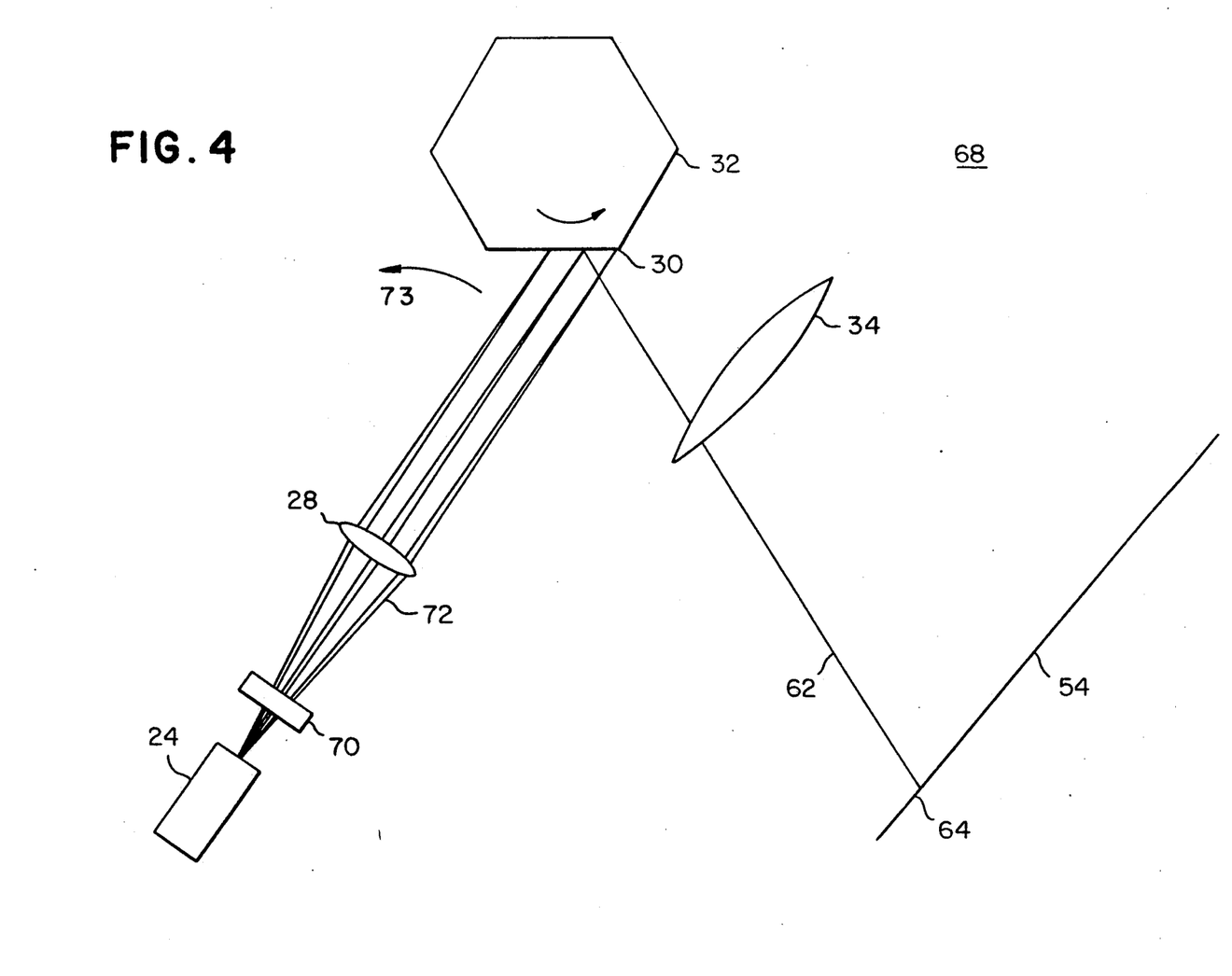
FIG. 4 shows an alternative embodiment of this invention in which a translation deflector is added in the path of the diverging optical beam between the modulated light source and the collimating lens.

FIG. 4 shows an alternative embodiment of this invention 68 in which a translation deflector 70 is interposed in the non-collimated beam 72, between the modulating light source 24 and collimating lens 28. The translation deflector 70 may be, for example, an electro-optical device constructed of an optically active crystal and configured to displace the beam as a function of the applied voltage. Thus, in the alternative embodiment of FIG. 4, when an appropriate sawtooth voltage is applied to translation deflector 70, the beam 72 is translated prior to entering lens 28 and thereby causes angular deflection of the beam exiting lens 28. The direction of motion 73 is opposite to that due to moving facet 30. The effect is thus similar to the use of an angular deflector 50 following lens 28.

Figure 5A:
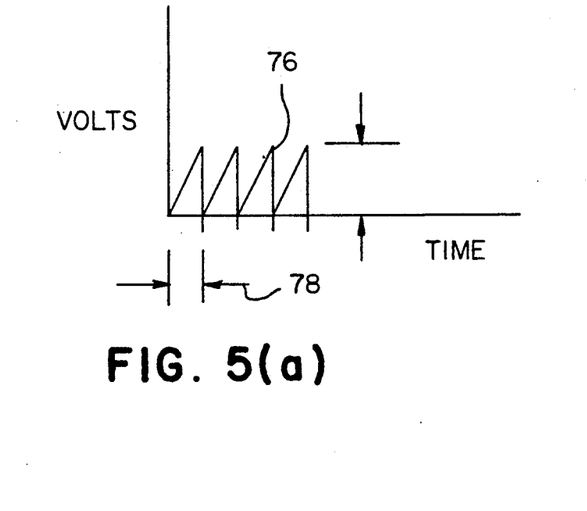
FIG. 5(a) presents a graph of the waveform which is applied to the angle deflector during each pixel time.
Figure 5B:
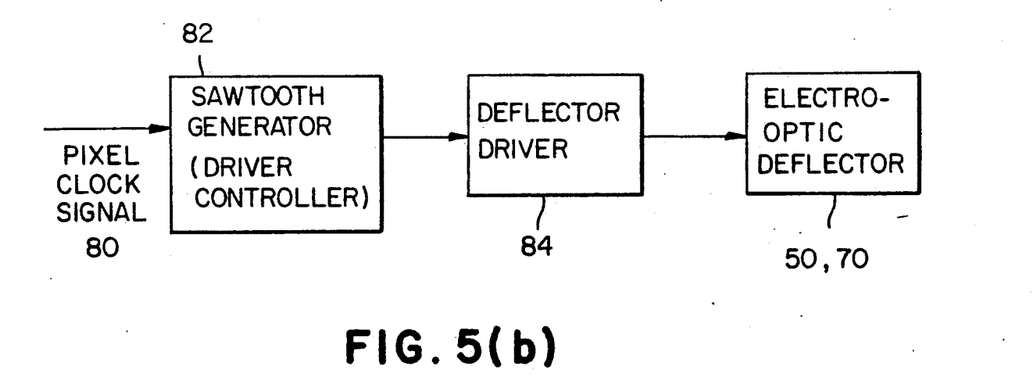
FIG. 5(b) is a block diagram of circuitry which accepts the system pixel clock signal, generates the waveform shown in FIG. 1b, and uses the waveform to drive the deflector of this invention.

FIG. 5a shows a properly phased sawtooth deflecting waveform 76, of the type which would be applied to angle deflector 50 or translation deflector 70 during each pixel time, so that each pixel is stabilized in succession. The sawtooth voltage 76 is repeated during each pixel time 78. In FIG. 5b, the scanning system's pixel clock (not shown) is used to synchronize the generation of the sawtooth in the sawtooth generator, or driver controller, 82. The pixel clock signal 80 is essential to synchronize the pixel video data to the scanning system, and as such, is available in all such scanning systems. The sawtooth generator 82 drives a deflector driver 84. The deflector drivedr 84 delivers a drive signal, having proper characteristics, to the deflector 50, 70.

The net result of employing the subject invention is that the pixel pattern laid down along the scan line will be that shown in FIG. 1b, in which each pixel is distinct and has maximum possible contrast. This is quite different from the result obtained with conventional flying spot scanners; as shown in FIGS. 1c and 1e where the contrast gradient is decreased by exposure blur, and an alternating series of exposed and unexposed pixels are greatly decreased in contrast. Although not specifically addressed here, the method and apparatus of the present invention may also be utilized in an input scanner.

Although the present invention has been described in detail with reference to a particular preferred embodiment, persons possessing ordinary skill in the art to which this invention pertains will appreciate that various modifications and enhancements may be made without departing from the spirit and scope of the claims that follow.

LIST OF REFERENCE NUMERALS

FIG. 1

10 Desired pixel pattern along scan line
12 Preferred pattern using round pixels
14 Start of first pixel
16 End of first pixel, start of second pixel
18 End of second pixel
20a Start of third pixel
20b End of third pixel
21a Start of fourth pixel
21b End of fourth pixel
22a Idealized horizontal exposure profile
22b Realistic horizontal exposure profile

FIG. 2

23 Generic flying spot scanner
24 Modulated light source (laser)
26 Optical output beam
28 Collimating lens(es)
30 Mirror facet
32 Rotating polygonal scan mirror
34 Focussing lens(es)
36 Beam position corresponding to first pixel
38 Beam position corresponding to last pixel
40 Scan line
42 Pixel dimension along scan line
44 Linear time vs. distance plot of beam
46 Preferred time vs. distance plot

FIG. 3

48 Flying spot scanner incorporating angle deflector
50 Angle deflector
54 Photoreceptor
60 Collimated portion of beam
62 Beam corresponding to first pixel, stabilized by second angle deflector
63 Direction of angular deflection
64 Location of first pixel on photoreceptor

FIG. 4

68 Flying spot scanner incorporating translation deflector
70 Translation deflector
72 Diverging portion of beam
73 Direction of translatory motion

FIG. 5

76 Sawtooth voltage
78 Pixel time
80 Pixel clock signal
82 Sawtooth generator (driver controller)
84 Deflector driver

What is claimed is:

1. An apparatus comprising:
   a. a flying spot scanner means (23) for scanning an optical beam (26),
   said flying spot scanner means (23) including a modulated light source (24),
   said optical beam (26) having a collimated portion (60) and a non-collimated portion (72);
   b. a first deflector means (30, 32) for scanning said optical beam (26) at a first scan speed, and in a first scan direction, continuously along a scan line (40),
   said scan line (40) including a continuous plurality of pixels (12), including a first pixel, and a last pixel, each of said plurality of pixels (12) being associated with a pixel time (78);
   c. a second deflector means (50, 70), for holding said optical beam (26) stationary during said pixel time (78),
   said second deflector means (50, 70) capable of moving said optical beam (26) in a second scan direction during said pixel time (78),
   said second scan direction being opposite to said first scan direction, and having a scan speed equal to said first scan speed,
   said second deflector means (50, 70) causing each of said plurality of pixels (12) to remain stationary on said scan line (40) during said pixel time (78),
   said second deflector means (50, 70) ceasing to move said optical beam (26) at a completion of said pixel time (78),
   said first deflector means (30, 32) causing said optical beam (26) to move rapidly to another of said plurality of pixels (12) at said completion of said pixel time (78);
   d. a driver means (84) for driving said second deflector means (50, 70); and
   e. a driver controller means (82) for controlling said driver means (84).

2. An apparatus as in claim 1, where said driver controller means (82) generates a sawtooth control signal (76).

3. An apparatus as in claim 2, where said second deflector means (50) is located in said collimated portion (60) of said optical beam (26), and said second deflector means (50) causes an angular deflection of said optical beam (26).

4. An apparatus as in claim 2, where said second deflector means (70) is located in a noncollimated portion (72) of said optical beam (26), and said second deflector means (70) causes a translational deflection of said optical beam (26).

5. An improved resolution flying spot scanner, (48, 68), comprising:
   a. a modulated light source (24) which produces an optical beam (26), said optical beam (26) scanning each of a plurality of pixels (12) in a scan line (40);
   b. a first beam deflector (30), which imparts a continuous first scan motion of said optical beam (26) along said scan line (40), with a first scan velocity;
   c. a second beam deflector (50, 70), which imparts a secondary scan motion to said optical beam (26), along said scan line (40), said secondary scan motion having a velocity opposite to said first scan velocity,
   said secondary scan motion stabilizing each of a plurality of pixels (12) in said scan line (40);
   d. a deflector driver (84) which provides a drive signal to said second beam deflector (50, 70); and
   e. a driver controller (82), which associates a pixel time (78) with each of said plurality of pixels (12), and which provides a control signal to said deflector driver (84).

6. A method of stabilizing an optical beam (26), comprising the steps of:
   a. using a beam deflector (30) to continuously scan said optical beam (26) along a scan line (40), at a first velocity;
   b. providing a pixel time (78) corresponding to each of a plurality of pixels (12) in said scan line (40);
   c. positioning a second angle deflector (50) in a collimated portion (60) of said optical beam (26);
   d. deflecting said optical beam (26) through an angular deflection during said pixel time (78) by said second angle deflector (50), said angular deflection being of an opposite velocity to said first velocity;
   e. cancelling out said first velocity with said opposite velocity, stabilizing said optical beam (26) on each of said plurality of pixels (12) during said pixel time; and
   f. repeating said angular deflection, during each of said pixel times (78).

7. A method of stabilizing an optical beam (26), comprising the steps of:
   a. continuously scanning said optical beam (26) along a scan line (40), with a first velocity;
   b. providing a pixel time (78) corresponding to each of a plurality of pixels (12) in said scan line (40);
   c. positioning a translation deflector (70) in a non-collimated portion (72) of said optical beam (26);
   d. translating said optical beam (26) during said pixel time (78), by said translation deflector (70), said translation having an opposite velocity to said first velocity;
   e. cancelling out said first velocity by said opposite velocity, stabilizing said optical beam (26) on each of said plurality of pixels (12) during said pixel time (78); and
   f. repeating said translation during each of said pixel times (78).

* * * * *